United States Patent
Ortiz et al.

(10) Patent No.: US 9,178,859 B1
(45) Date of Patent: Nov. 3, 2015

(54) NETWORK EQUIPMENT AUTHENTICATION

(71) Applicant: Cisco Technology, Inc., San Jose, CA (US)

(72) Inventors: Paul Ortiz, San Francisco, CA (US); Shelley Raina, Austin, TX (US); Samip Bhavsar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 21 days.

(21) Appl. No.: 13/957,815

(22) Filed: Aug. 2, 2013

Related U.S. Application Data

(60) Provisional application No. 61/751,361, filed on Jan. 11, 2013.

(51) Int. Cl.
*H04L 29/06* (2006.01)
*G06F 21/70* (2013.01)
*G06F 11/20* (2006.01)

(52) U.S. Cl.
CPC ............ *H04L 63/08* (2013.01); *G06F 21/70* (2013.01); *G06F 11/2002* (2013.01)

(58) Field of Classification Search
CPC . G06F 21/44; G06F 2221/2129; G06F 21/73; G06F 21/70; G06F 11/2002; G06F 11/2247; H04L 63/08
USPC ............................................................. 726/5
See application file for complete search history.

(56) References Cited

U.S. PATENT DOCUMENTS

| | | | |
|---|---|---|---|
| 5,424,944 A * | 6/1995 | Kelly et al. | 705/28 |
| 7,818,790 B1 * | 10/2010 | Burns et al. | 726/7 |
| 8,413,885 B2 | 4/2013 | Frad et al. | |
| 2002/0120535 A1 * | 8/2002 | Yu | 705/29 |
| 2003/0033260 A1 * | 2/2003 | Yashiro et al. | 705/400 |
| 2003/0141358 A1 * | 7/2003 | Hudson et al. | 235/375 |
| 2004/0128260 A1 * | 7/2004 | Amedure et al. | 705/75 |
| 2004/0153686 A1 * | 8/2004 | Gilstrap et al. | 714/1 |
| 2005/0144132 A1 * | 6/2005 | Lin | 705/50 |
| 2006/0290500 A1 * | 12/2006 | Sagawa | 340/572.1 |
| 2009/0079544 A1 * | 3/2009 | Noble | 340/10.1 |
| 2010/0269156 A1 * | 10/2010 | Hohlfeld et al. | 726/4 |

(Continued)

OTHER PUBLICATIONS

Stradley et al., The Electronic Part Supply Chain and Risks of Counterfeit Parts in Defense Applications, Sep. 2006, IEEE Transactions on Components and Packaging Technologies, vol. 29, No. 3, pp. 703-705.*

(Continued)

*Primary Examiner* — Kenneth Chang
(74) *Attorney, Agent, or Firm* — Edell, Shapiro & Finnan, LLC

(57) ABSTRACT

Presented herein are authentication systems and methodologies for equipment deployed in an operational electronic network. Information about a piece of network-connected equipment is received, wherein the information includes a plurality of attribute values characterizing the equipment, wherein the information is obtained via a query to the equipment that produces, as output, the plurality of attribute values. The attribute values are compared to stored values, and when one or more of the attribute values are determined to be outside a range of the stored values, the equipment is designated as non-authentic. Non-authentic equipment may include counterfeit and grey marketed equipment.

20 Claims, 6 Drawing Sheets

(56) References Cited

U.S. PATENT DOCUMENTS

| | | | |
|---|---|---|---|
| 2011/0093703 A1* | 4/2011 | Etchegoyen | 713/168 |
| 2011/0295908 A1* | 12/2011 | To et al. | 707/803 |
| 2012/0089835 A1* | 4/2012 | Peckover | 713/168 |

OTHER PUBLICATIONS

Guin et al., "Counterfeit IC Detection and Challenges Ahead", retrieved from Internet 2013, 5 pages.

VeriSign The Value of Trust, Open Authentication, 2004, pp. 1-13.

IT@Intel Brief, "Network Access Control: User and Device Authentication", Intel Information Technology, Aug. 2005, pp. 1-4.

Cisco, Newer Cisco SBA Guides Available, "Network Device Authentication and Authorization Deployment Guide", Feb. 2012, 28 pages.

Saruhan, "Detecting and Preventing Rogue Devices on the Network", SANS Institute InfoSec Reading Room, Aug. 8, 2007, 63 pages.

* cited by examiner

| |
|---|
| CHASSIS SERIAL NUMBER |
| END USER ADDRESS |
| END USER COUNTRY |
| END USER NAME |
| END USER ZIP CODE |
| MOTHERBOARD PART NUMBER |
| MOTHERBOARD SERIAL NUMBER |
| POWER SUPPLY PART NUMBER |
| POWER SUPPLY SERIAL NUMBER |
| PROCESSOR BOARD ID |
| PRODUCT IDENTIFICATION |
| TOP ASSEMBLY PART NUMBER |
| VENDOR NAME |

FIG.5

NETWORK EQUIPMENT AUTHENTICATION

This application claims the benefit of U.S. Provisional Patent Application No. 61/751,361, filed Jan. 11, 2013, which is incorporated herein by reference in its entirety.

TECHNICAL FIELD

The present disclosure relates generally to authentication systems and methodologies for equipment deployed in an operational electronic network.

BACKGROUND

A computer or electronic network is a network comprising a plurality of interconnected data processing nodes, e.g., computers, arranged such that the computers can share information with one another. A computer network may be classified by various characteristics, such as the media used to transmit signals, the communications protocols used to organize network traffic, network scale, network topology, benefits, and organizational scope. Of course, the most widely known and used network is the Internet, which has enabled a global system of interconnected computer networks, that use the standard Internet protocol suite, namely Transmission Control Protocol/Internet Protocol (TCP/IP) to serve billions of users worldwide. The Internet can be considered a network of networks that comprises millions of private, public, academic, business, and government networks, of local to global scope, that are linked by a broad array of electronic, wireless and optical networking technologies. The Internet carries an extensive range of information resources and services, such as inter-linked hypertext documents of the World Wide Web (WWW) and the infrastructure to support email, among others.

A substantial amount of electronic hardware is needed to enable such extensive connectivity. That hardware comprises, among other things, physical cabling including copper and fiber optic cable, network interface cards, and thousands and thousands of, e.g., routers and switches, among other hardware devices (hereinafter "equipment") that are responsible for directing packet data from virtually any given source to virtually any given destination around the globe or within a home network.

BRIEF DESCRIPTION OF THE DRAWINGS

FIG. 5 depicts example attributes associated with network connected equipment that can be used to identify unauthorized or non-authentic equipment.

DESCRIPTION OF EXAMPLE EMBODIMENTS

Overview

Figure 1:
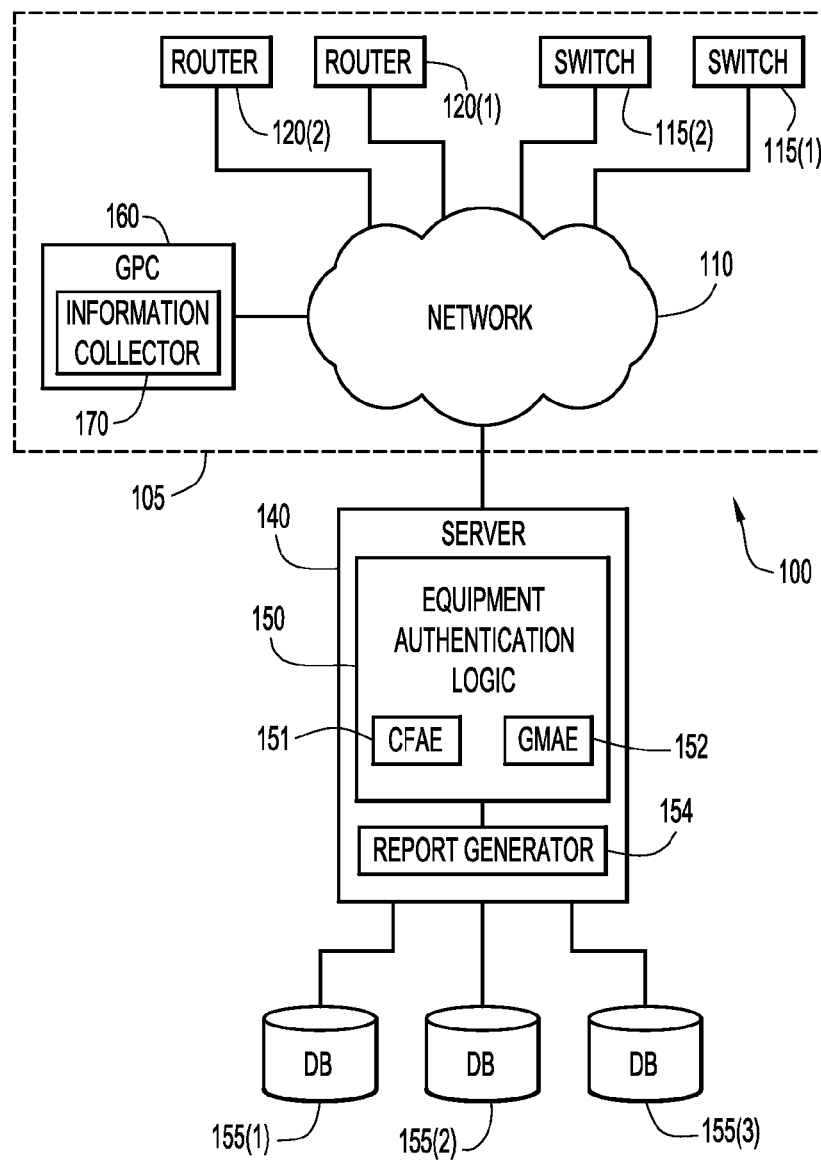
FIG. 1 is a schematic diagram illustrating a network in which equipment authentication can be achieved, using equipment authentication logic, in accordance with examples presented herein.

Presented herein are techniques for automatically inspecting and authenticating equipment that is deployed in an operational network to determine whether any of the equipment might be suspected of not being authentic. Information about a piece of network-connected equipment is received, wherein the information includes a plurality of attribute values characterizing the equipment and wherein the information is obtained via a query to the equipment that produces, as output, the plurality of attribute values. The attribute values (or combinations thereof) are compared to stored values, and when one or more of the attribute values are determined to be outside a range of the stored values, the equipment is designated as non-authentic. Non-authentic equipment may be characterized as Counterfeit equipment, Counterfeit Upgraded equipment, Grey Market equipment and/or Serial Number Altered equipment.

Example Embodiments

As the number and types of deployed equipment continue to grow to keep pace with the demand for ever-increasing electronic network services, control over and/or of the deployed equipment can become difficult. Specifically, in recent years, Counterfeit and Grey Marketed devices have been discovered in some operational networks. Unauthorized equipment of this sort that supports electronic networks can lead to multiple issues, not the least of which include lost revenue to the manufacturers and resellers of the equipment, lost control over quality control of the equipment, and possibly impaired safety and security of the equipment and associated network.

In the following description several types of non-authentic equipment are described. These types include:

Counterfeit equipment. Such equipment is defined as "pure" counterfeits made with off-the-shelf components and counterfeit printed circuit boards (PCBs). Such equipment masquerades as equipment having been manufactured by an original equipment manufacturer (OEM), but in fact has not been manufactured in that way.

Counterfeit Upgraded equipment. Such equipment is original genuine equipment that has been upgraded, without proper authorization from the manufacturer or reseller, from, e.g., low range capability to mid or high range capability.

Grey Marketed equipment. This type of equipment includes genuine equipment that may have been sold or resold outside of authorized sales channels, i.e., equipment diverted from official sales channels that does not reach its intended end user.

Serial Number Altered Products. This category of equipment comprises genuine equipment whose Serial Number or Product ID has been tampered with. For example, labels may be surreptitiously altered or electronically erasable programmable read only memory (EEPROM) content may be modified to hide the origin of a product, or to conceal service abuse, among other possible alterations.

Such non-authentic network equipment has become an increasingly problematic issue for equipment manufacturers, re-sellers, servicers, etc. as such equipment can negatively impact product and service revenue, profit margins, direct sales, partner sales and services, among other opportunities. In addition, non-authentic equipment can negatively impact brand and customer confidence. Further still, a user's network may be at risk when non-authentic equipment is used as such equipment does not support the quality, safety and security standards provided by genuine and/or authentic equipment.

To address the issue of non-authentic equipment, a first step is to identify suspicious equipment that may be deployed in a given network environment or enterprise. The equipment might include, among other devices, routers and switches. In accordance with an embodiment described herein, a server is provided that hosts an equipment authentication module or corresponding logic that may be in the form of hardware or software, or a combination of hardware and software. The equipment authentication logic is configured to operate in accordance with the techniques described in detail below.

In one embodiment, the techniques described herein support a client/server model where data is collected securely at a Customer's site or enterprise (i.e., a network) and transmitted securely to a Solution Provider (e.g., an operator of the server) for authentication of equipment deployed in that enterprise. That is, under this embodiment, at least some aspects of equipment authentication techniques are performed at a customer site, while other aspects are performed in a different location. In another possible embodiment, a secure device may be placed within a Customer's environment or enterprise in order to provide a full solution, all within the secure device—without information leaving the customer's environment.

Regardless of the deployment selected, both solutions comprise collecting information from the equipment at the customer's site (i.e., within their network/enterprise) and processing the information using a set of techniques to identify and detect suspicious equipment, i.e., equipment suspected of being non-authentic.

At the conclusion of processing, a report may be generated about the equipment, and selected equipment may be flagged as suspicious in one or more of the four categories, namely Counterfeit, Counterfeit Upgraded, Grey Marketed or Serial Number Altered.

More specifically, and with reference to FIG. 1, a system 100 consistent with the principles described herein includes an electronic network 110 that comprises several different components including a plurality of switches 115(1), 115(2) (generally 115), a plurality of routers 120(1), 120(2) (generally 120), a server 140, a plurality of databases 155(1), 155(2), 155(3) (generally 155), and a general purpose computer (GPC) 160. Network 110 may be any wired or wireless electronic network such as a local area network (LAN), wide area network (WAN), the Internet, a private network, or any suitable electronic physical plant that enables connectivity between the several other components connected thereto.

Switches 115 and routers 120 may be connected to other like switches and routers (not shown) enabling end point nodes (such as computers) to communicate with one another using, e.g., TCP/IP or any other like protocol.

Server 140 (the physicality of which is described more fully with respect to FIG. 6) comprises Equipment Authentication Logic 150, including Counterfeit Assessment Engine (CFAE) 151 and Grey Market Assessment Engine (GMAE) 152 (that will be described more fully below) and a report generator 154 in communication with Equipment Authentication Logic 150 that is configured to receive data from Equipment Authentication Logic 150 and output reports for, e.g., human consumption. As will be explained more fully below, such reports will identify specific pieces of equipment that have been designated as being suspicious of, or actually, being one of Counterfeit equipment, Counterfeit Upgraded equipment, Grey Marketed equipment and/or Serial Number Altered equipment.

Databases 155 may be physical repositories implemented through any combination of conventional Relational Database Management Systems (RDBMSs), Object Database Management Systems (ODBMSs), in-memory Database Management Systems (DBMSs), or through any other equivalent facility. Moreover, databases 155 are shown as being separate physical devices, however, those skilled in the art will appreciate that such database may be combined into a single repository, or distributed into multiple repositories as long as the data being stored therein is accessible to server 140, and in particular Equipment Authentication Logic 150 being hosted thereon.

GPC 160 may be any general purpose computer, including a server that can be configured to collect information, using Information Collector 170, about the several pieces of equipment that are within "view" or "reach" of the Information Collector 170 within an enterprise zone 105.

At a high level, embodiments described herein employ Information Collector 170 to collect information, including a plurality of individual attributes characterizing the equipment (e.g., switches 115, routers 120, etc.) to which information Collector 170 has access. Once this information is collected, it is passed to Equipment Authentication Logic 150 that processes the collected information to determine whether any of the equipment within the enterprise 105 could be considered suspect as not being an authenticate piece of equipment supplied by an original manufacturer or authorized dealer, or repaired by an authorized service establishment. Equipment about which there may be suspicions in view of the processing function of Equipment Authentication Logic 150 may then be flagged and reported via report generator 152 directly to a customer having responsibility over and/or ownership of enterprise 105, or, instead, first reported to an operator of Equipment Authentication Logic 150 for internal review prior to sharing with the customer.

Figure 2:
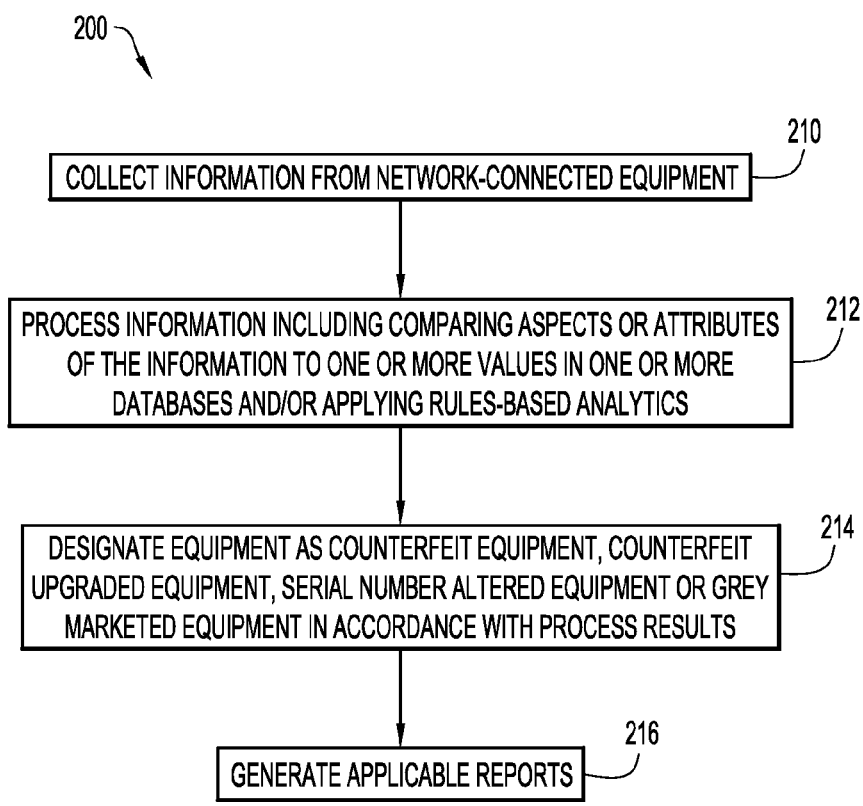
FIG. 2 is an example flow diagram that depicts an overall approach for discovering unauthorized equipment in an operational network.

Reference is now made to FIG. 2, which depicts an example flow diagram 200 that depicts an approach for discovering unauthorized equipment in an operational network. Several high level operations are described next, namely, collection of information, transmission of that information, authentication of the equipment based on the information and related data, and report generation.

More specifically, at 210, information, including a plurality of attributes, characterizing network connected equipment is collected. At 212, that information is supplied to an analytics module wherein the information is processed. Processing may include, for example, comparing aspects of the information (e.g., individual attributes) to entries in one or more databases, and/or applying rules-based analytics to the information. At 214, depending on the results of the information processing, one or more network connected pieces of equipment are designated as at least being suspicious of being Counterfeit, Counterfeit Upgraded, Grey Marketed or Serial Number Altered. At 216, reports are generated that enable users to further investigate the suspicions equipment. The reports may include, for example, the name, physical and logical location, and any other identifying features of the suspect equipment, thereby enabling a user to find the equipment and perform a visual inspection thereof and, as appropriate, perform selected diagnostics on the equipment.

Figure 3:
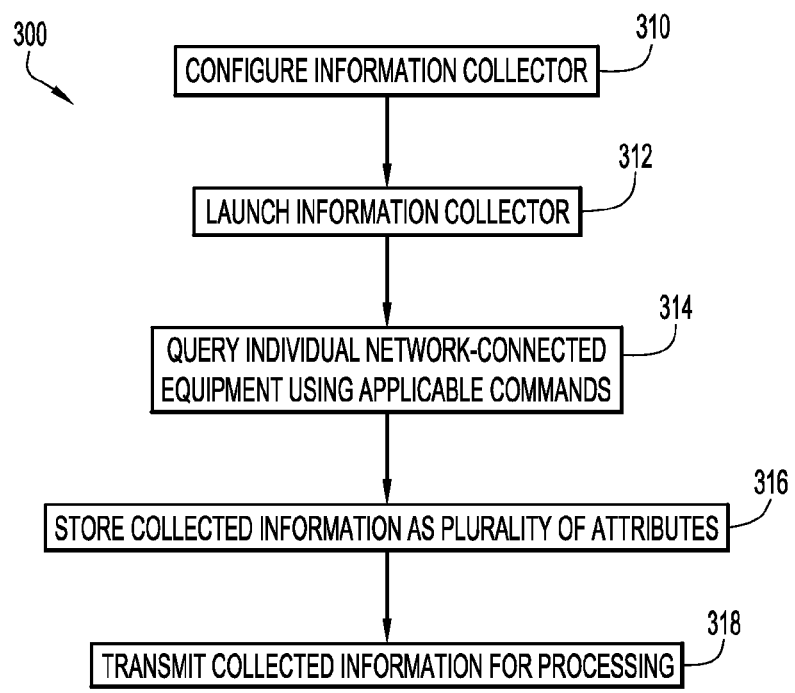
FIG. 3 is an example flow diagram that depicts an approach for collecting information from network connected equipment.

FIG. 3 is an example flow diagram 300 that depicts an approach for collecting information from network connected equipment. At 310, Information Collector 170 is configured to operate in a given enterprise. Information Collector 170 may be downloaded to GPC 160 (FIG. 1) from e.g., server 140, or be shipped on a (non-transitory) computer readable medium, such as a CD ROM, thumb drive, etc., and loaded on GPC 160. Configuration parameters might include how often Information Collector 170 is to perform information collection, time periods over which collection should be scheduled, what types of equipment should be targeted, and the format of information that is stored, once collected.

At 312, and at the appropriate time consistent with configuration parameters, information collection is launched. At 314, network-connected equipment is queried using applicable commands. Specifically, information collection is used to collect specific information from specific equipment. Targeted equipment may include switches, routers, line cards, transceiver modules, etc. In one approach, Information Collector 170 is configured to "crawl through" an existing operational network (e.g., enterprise 105), identify the individual pieces of equipment and then collect specific information from the identified equipment.

As a non-limiting example, consider a selected router. For example, for a CISCO 1805 router, Information Collector 170 identifies the given piece of equipment as a CISCO1805-D/K9 router and initiates a "Show Version" Command. Information Collector 170 then parses specific attributes from a response to that command that are employed by the authentication techniques described herein. For example, one of the parameters or attributes made available through the "Show Version" command is "Processor Board ID". An example output of a "show version" command is shown below with the Processor Board ID parameter bolded.

Example

Router#show ver
Cisco 105 Software, 1805 Software (C1805-ADVIPSER-VICESK9-M), Version 12.4(15)XY3, RELEASE SOFTWARE (fc3)
Technical Support: http://www.cisco.com/techsupport
Copyright (c) 1986-2008 by Cisco Systems, Inc.
Compiled Thu 22-May-08 15:49 by prod_rel_team
ROM: System Bootstrap, Version 12.4(13r)T, RELEASE SOFTWARE (fc1)
Router uptime is 1 minute
System returned to ROM by power-on
System image file is "flash:c1805-advipservicesk9-mz.124-15.XY3.bin"
This product contains cryptographic features and is subject to United States and local country laws governing import, export, transfer and use. Delivery of Cisco cryptographic products does not imply third-party authority to import, export, distribute or use encryption. Importers, exporters, distributors and users are responsible for compliance with U.S. and local country laws. By using this product you agree to comply with applicable laws and regulations. If you are unable to comply with U.S. and local laws, return this product immediately.
A summary of U.S. laws governing Cisco cryptographic products may be found at:
http://www.cisco.com/wwl/export/crypto/tool/stqrg.html
If you require further assistance please contact us by sending email to export@cisco.com.
Cisco 1805 (revision 1.0) with 177152K/19456K bytes of memory.
    Processor board ID FTX1416814L
    6 FastEthernet interfaces
    1 Virtual Private Network (VPN) Module
    1 Cable Modem interface
    DRAM configuration is 64 bits wide with parity disabled.
    191K bytes of NVRAM.
    62720K bytes of ATA CompactFlash (Read/Write)
    Configuration register is 0x2102

The above example is only one of the possible attributes that can be collected from a router device. Many other attributes can be collected, including Hardware revision number, other Serial Numbers for line cards and modules and Product specific information. A non-limiting list of attributes that may be leveraged by the techniques described herein is provided in FIG. 5.

At 316, collected information (or selected attributes thereof) is stored at GPC 160 via Information Collector 170. In one embodiment, the collected information is stored with a reference that identifies a unique customer and collection, e.g., Customer ID and Collection ID along with a time stamp. This latter information may be used by a customer to keep track of all their collections from that collector instance. Ultimately, at 318, the collected information or selected attributes may be transmitted to, e.g., server 140 and Equipment Authentication Logic 150 for further processing. Transmission may be via Secure Web Services, Secure Email, and/or Secure FTP, among other transmission techniques.

In one implementation, one of three states is assigned to the collected information obtained by Information Collector 170: Collection Complete, Collection Transmitted or Collection Reconciled. The table below is an example of how collected information might be stored.

| Time Zone/Date/Timestamp | Collection ID | Status |
|---|---|---|
| GMT/Jan. 11, 2013 13:15:01 | xxx-001 | Collection Complete |
| GMT/Jan. 12, 2013 13:20:15 | xxx-002 | Collection Complete, Collection Transmitted |
| GMT/Jan. 13, 2013 15:30:00 | xxx-003 | Collection Complete, Collection Transmitted, Collection Reconciled. |

In an embodiment, a customer operating Information Collector 170 has the flexibility of deleting any collection at any time. If the customer runs out of allotted memory in a storage device in GPC 160, for example, the customer can choose which collections they want to keep and which they want to delete.

Further, Information Collector 170 may be configured to correlate the report data to the original information collected. For example, if a customer collects information about equipment with a given Internet Protocol (IP) Address and Host Name, the customer may choose to index the equipment and not show the IP Address and Host Name. Once a final report is generated, the customer can then feed the report into Information Collector 170 and use the index to identify the IP address and Host name. In this way, the customer may identify the location of the device in their network for replacement if needed. This indexing approach might be particularly useful where the enterprise is of a classified nature.

Thus, the information that is stored in Information Collector 170 may take the form of:

| Index | IP Address | Hostname | Show version | Show . . . | Show . . . |
|---|---|---|---|---|---|
| D-001 | 1.1.1.1 | H1 | content | content | content |
| D-001 | 2.2.2.2 | H2 | content | content | Content |

On the other hand, report data that is returned to Information Collector 170 may then take the form of:

| Index | CF Assessment | GM Assessment |
|-------|---------------|---------------|
| D-001 | Suspect CF    | None          |
| D-002 | Not suspect   | Suspect GM    |

Upon receipt, Information Collector 170 can then reconcile the report with the collected data as indicated below:

| Index | IP Address | Hostname | CF Assessment | GM Assessment |
|-------|-----------|----------|---------------|---------------|
| D-001 | 1.1.1.1   | H1       | Suspect CF    | None          |
| D-001 | 2.2.2.2   | H2       | Not suspect   | Suspect GM    |

Although it may be desirable to have Information Collector 170 and Equipment Authentication Logic 150 tightly coupled, and even developed as an integrated system, those skilled in the art will appreciate that it is possible for users to deploy their own collector or proprietary tools to collect information from their enterprise-deployed equipment. To the extent such an approach is taken, the equipment manufacturer or Service Provider may provide the customer with a list of appropriate "show" commands to be executed in order to obtain the information (and attributes) later employed to detect unauthorized equipment.

Figure 4:
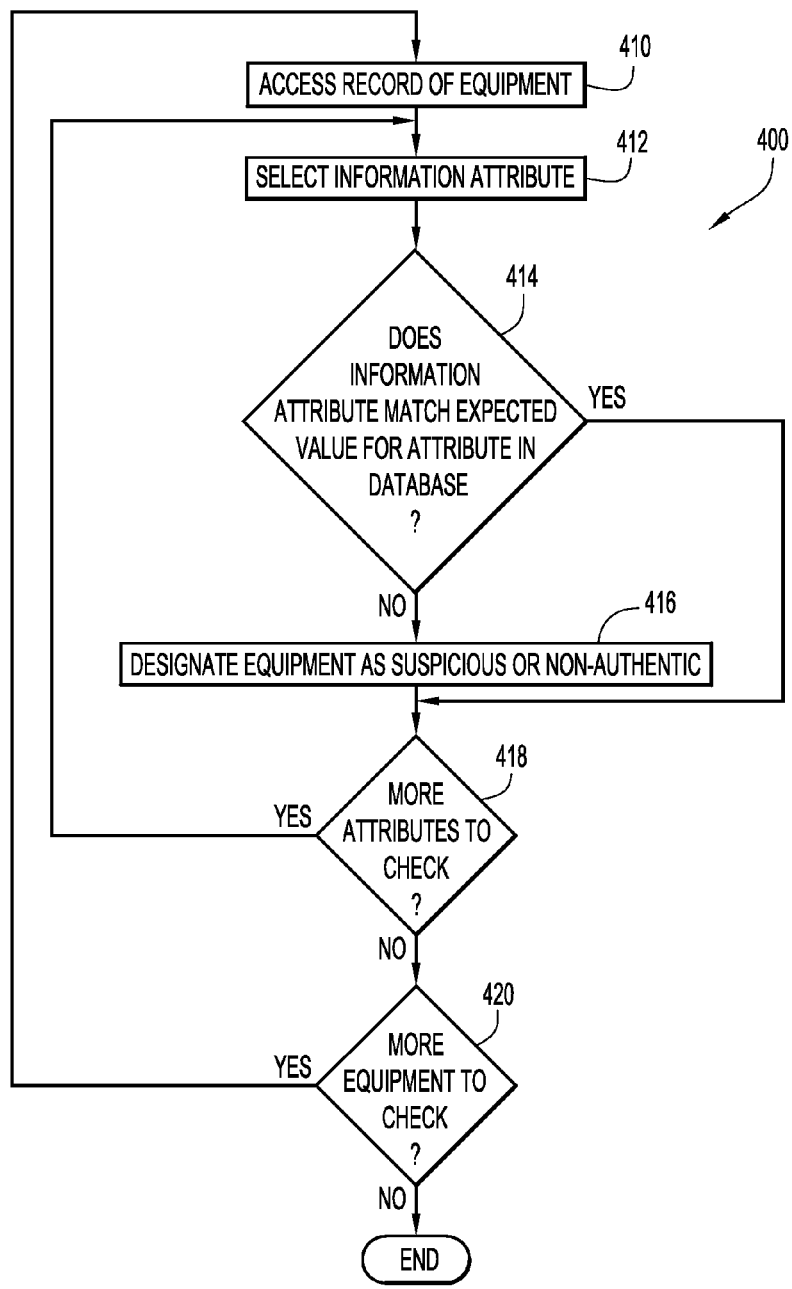
FIG. 4 is an example flow diagram that depicts an approach for detecting whether given network connected equipment is suspected of not being authentic.

As per FIG. 2, after the information about equipment is collected (and possibly transmitted to another location), that information is subjected to rigorous analysis with the goal of detecting whether any of the equipment from which the information has been collected ought to be suspected of being non-authentic. FIG. 4 is an example flow diagram 400 that depicts an approach for detecting whether given network connected equipment is suspected of not being authentic. At 410, a record of a given piece of equipment is accessed. That is, the previously collected information may be stored on one or more databases 155 and Equipment Authentication Logic 150 selects the given piece of equipment for analysis by accessing a record, object, container or other data structure via which the information has been stored.

At 412, a particular information attribute is selected for analysis. At 414, it is determined whether the selected information attribute matches an expected value or range of values for that attribute in one or more authentication databases. If a mis-match is determined, then at 416 the equipment being analyzed is designated as suspicious. Suspicion may arise on account of the attribute being processed being indicative that the equipment is one of Counterfeit equipment, Counterfeit Upgraded equipment, Grey Market equipment and/or Serial Number Altered equipment.

If at 414 the selected information attribute (i.e., the value thereof) matches an expected value or range of values in the database being checked, then the equipment being analyzed (at least with respect to the selected attribute) is not designated as being suspicious, i.e., 416 is skipped.

At 418, it is determined whether there are more information attributes to check, analyze or process. If yes, then a next attribute within the record of equipment is selected at 412. If no more attributes are to be checked for the equipment then being analyzed, then at 420 it is determined if there is more equipment to be analyzed or processed. If not, the methodology completes for that set of equipment for which information was received from Information Collector 170. If more equipment is to be processed, then the methodology returns to 410 to analyze the next piece of equipment. Thus, those skilled in the art will appreciate that the methodology depicted in FIG. 4 is a more detailed description of operations 212 and 214 shown in FIG. 2, whereby individual pieces of equipment and individual attributes characterizing the same are analyzed to determine whether any of the equipment should be considered suspicious as being any one of Counterfeit equipment, Counterfeit Upgraded equipment, Grey Market equipment and/or Serial Number Altered equipment.

In one possible implementation, two separate "engines" are employed to analyze the collected data and to generate a report. As explained briefly with respect to FIG. 1, the two engines are a Counterfeit Assessment Engine (CFAE) 151 and a Grey Market Assessment Engine (GMAE) 152. These engines are configured based on intelligence gathered by, e.g., a Brand Protection team within an equipment manufacturing or sales enterprise. The intelligence may be based on observations, data keeping, analyses and trends from field investigations. This intelligence is documented as rules to be executed by Equipment Authentication Logic 170 for Counterfeit analysis Grey Market analysis.

These rules are used in combination with data from, e.g., Manufacturing records, Enterprise Resource Planning (ERP) systems, Customer Data records, and Service Data records. The rules and data are used to analyze the collected information to identify suspicious equipment. CFAE 151 is configured to identify Counterfeit, Counterfeit Upgrades and Serial Number Altered Products and GMAE 152 is configured to identify Grey Marketed or diverted products. Below is one example each of a Counterfeit and Grey Market analysis.

Example

Counterfeit Assessment

From the example above, Information Collector 170 identified equipment as a Cisco 1805 router with a processor board ID FTX1416814L. Accordingly, CFAE 151 is now aware of the Product ID and also the Board ID of the product. In this case, the Board ID is synonymous with a Serial Number of the product. CFAE 151 in combination with Equipment Authentication Logic 170 analyzes various data sources, e.g., stored within databases 155, by comparing that Board ID value with expected values (or ranges of values) for the Product ID. One of the following scenarios will emerge:

The Product ID and Processor Board ID are found to be the same in various databases as on the equipment. As such, the equipment will be marked as "Not Suspicious" (at least with respect to this attribute).

The Processor Board ID is not existent in the various databases. In this case, the equipment may be mark or flagged as "Suspicious—Counterfeit".

The Product ID and Processor Board ID do not match each other in the various databases though existent in the databases. In this scenario, the equipment may be marked or flagged as "Suspicious—Serial Number Altered" or "Suspicious—Counterfeit Upgrade" depending on the nature of discrepancies with data in databases 155.

Those skilled in the art will appreciate that the foregoing represents just one example and a relatively simple analysis. Other simple and more complex rules can be applied to identify the suspiciousness of a given piece of equipment.

Example

Grey Market Assessment

Different from Counterfeit equipment, Grey Market products are, e.g., OEM products that are diverted from authorized channels or that are sold to someone other than the intended user, and/or used products that are sold to an end user without new software licenses or equipment inspections.

In accordance with Grey Market analysis performed by GMAE 152 in concert with Equipment Authentication Logic 150, the collected serial numbers of equipment are first validated. It is noted that it may not be effective or even possible to perform Grey Market analysis on counterfeit products. Further, for counterfeit upgraded and serial number tampered products, for example, original/authentic serial numbers are employed to check if the equipment was repaired in an authorized facility. In other words, serial number validation may be performed before Grey Market analysis proceeds. In this regard, counterfeit assessment is at least one facet of validation. Then, for each serial number, location addresses and phone numbers for expected customers for those serial numbers are accessed. With the latter data it is possible to determine whether equipment with the indicated serial numbers was sold though authorized channels. Non-matching serial numbers may be flagged as "diverted" and marked for further analysis.

A serial number marked as "diverted" and thus marked for further analysis may then be further flagged based on type.

More specifically, a diversion can be categorized as one of two types. A first type may be "domestic" diversion, wherein equipment has been diverted within a same country. A second type may be "international" diversion, wherein equipment has been diverted from one country to another.

International diversion may be determined by first determining whether a given serial number is known to be diverted, and if so, further determining whether the current country of deployment is the same as the expected country of deployment. If not, then the equipment may be designated as Grey Marketed equipment with international diversion.

The following provides an attribute listing (i.e., equipment information) for a given piece of equipment and expected data values for that same piece of equipment.

Example

Equipment Information Collection Results in the Following Attributes being Obtained Serial Number—JMX1447L1RL
Product ID—ASA5510-K8
Install Customer Name—COMPANY X
Install Location Address—201 XYZ BLVD
Install Location City—City X
Install Location State—CA
Install Location Zip Code—95138
Install Location Country—United States After analyzing data regarding SN JMX1447L1RL gleaned originally from original equipment manufacturer (OEM), sales partner, repair facility, etc. databases and now stored in, e.g., one of databases 155, the following information is found:

Serial Number—JMX1447L1RL
Product ID—ASA5510-K8
End User Customer Name—COMPANY Y
End User Location Address—OLGASTR. 95
End User Location City—City Y
End User Location State—BADEN-WUERTTEMBERG
End User Location Zip Code—89073
End User Location Country—Germany From the discussion above, it is apparent that the address (company, address, country, etc.) of the deployed equipment is not where it was expected to be. As such, that piece of equipment can be designated as Grey Marketed.

Those skilled in the art will appreciate that the foregoing is merely an example, and many such processes and rules may be applied to the collected data to identify grey market fraud.

FIG. 5 depicts example attributes associated with network-connected equipment that can be used to identify unauthorized or non-authenticate equipment. The attributes shown in FIG. 5 are listed in alphabetical order, and no specific hierarchy or order is implied. These attributes can be gleaned from "show version" or other like commands that cause network-connected equipment to respond with values for one or more of the attributes shown in FIG. 5.

Thus, taking, e.g., the attribute "power supply part number," the methodology is configured to compare the value of such a part number that is associated with a given, e.g., system serial number (originally gleaned from an OEM or sales partner database), and confirm whether that power supply is in the correct system. If it is not, it is possible that the system was improperly upgraded to include, e.g., a higher power supply. Such equipment might then be designated as Counterfeit Upgraded equipment.

As can be seen, the attribute listing shown in FIG. 5 includes end user address information as well that may be used in connection with Grey Market analysis.

It should be noted that while the "show command" supplies a plurality of attribute values, Equipment Authentication Logic 150, CFAE 151, and/or GMAE 152 do not necessarily use every attribute in the course of analysis. In fact, in order to obfuscate which attributes are actually used to authenticate equipment, it may be beneficial to collect significantly more information than might actually be needed to accurately identify suspicious equipment within an enterprise. Moreover, designating a piece of equipment as being non-authentic might only be triggered based on a plurality of non-matching attributes, including certain combinations of matching and non-matching attribute values.

Based on the output of Equipment Authentication Logic 150 in association with the CFAE 151 and GMAE 152, a report is generated for the customer that identifies the suspicious equipment in their respective categories, i.e., Counterfeit, Counterfeit Upgrade, Grey Marketed and Serial Number Altered. Equipment may further be categorized as High, Medium and Low risk on a threat scale. The reports themselves may be provided in paper fashion, electronically, or a combination thereof. Reporting may also include sending alerts to appropriate personnel. Such alerts may be by, e.g., email, or any other suitable messaging technique.

Examples

As a non-limiting example, consider a selected card manufactured by or for CISCO. For example, for a Cisco NM-1HSSI card, Information Collector 170 identifies the given piece of equipment as a NM-1HSSI=card and initiates a "show module" Command.

Information Collector 170 then parses specific attributes from a response to that command that are employed by the authentication techniques described herein. For example, one of the parameters or attributes made available through the "show module" command is "serial number". An example output of a "show module" command is shown below with the serial number parameter bolded.

Slot 1:
Mx HSSI-B Port adapter, 1 port
Port adapter is analyzed
Port adapter insertion time 1d05h ago EEPROM contents at hardware discovery:
Hardware revision 1.0 Board revision G0
Serial number 34854968 Part number 800-03616-02
FRU Part Number NM-1HSSI=
Test history 0x0 RMA number 00-00-00
EEPROM format version 1
EEPROM contents (hex):
0x00: 01 A1 01 00 02 13 D8 38 50 0E 20 02 00 00 00 00
0x10: 80 00 00 00 06 05 20 00 05 FF FF FF FF FF FF FF
0x20: FF FF FF FF FF FF FF FF FF FF FF FF FF FF FF FF
0x30: FF FF FF FF FF FF FF FF FF FF FF FF Attribute Check—Values from registry hex location 05-08 (bolded above): 02 13 D8 38, are taken and converted from hex to decimal. The converted value: 34854968, should match the unit serial number bolded above As another non-limiting example, consider a selected transceiver available from CISCO. For example, for a Cisco X2-10 GB-SR transceiver, Information Collector 170 identifies the given piece of equipment as a X2-10 GB-SR and initiates a "show idprom int te x/y" Command.

Information Collector 170 then parses specific attributes from a response to that command that are employed by the authentication techniques described herein. For example, one of the parameters or attributes made available through the "show idprom int te x/y" command is "manufacturing date" & "vendor serial number". An example output of a "show idprom int te x/y" command is shown below with the serial number parameter bolded.

R7R5-C3750E#show idprom int te 1/0/2
SEEPROM contents (hex) size 256:
0x00: 14 01 00 01 00 0B 77 A7 01 00 00 02 01 01 28 48
0x10: 01 01 00 00 00 00 00 00 00 00 00 00 1E 01 00 01
0x20: 4C 08 00 00 00 00 00 00 00 00 00 C0 98 20 03
0x30: 40 09 01 43 49 53 43 4F 2D 4F 50 4E 45 58 54 2C
0x40: 49 4E 43 54 52 54 32 30 30 35 45 4E 2D 53 4D 43
0x50: 2D 31 36 30 36 4F 4E 54 31 36 34 30 30 32 4B 4C
0x60: 20 20 20 20 | 20 32 30 31 32 31 30 30 32 30 30 00
0x70: 20 40 04 D1 00 00 41 58 32 2D 31 30 47 42 2D 53
0x80: 52 20 20 20 20 20 20 20 56 30 36 20 4F 4E 54 31
0x90: 36 34 30 30 32 4B 4C 31 30 2D 32 32 33 35 2D 30
0xA0: 36 20 20 41 30 20 20 00 00 00 00 00 00 00 00 00
0xB0: 00 00 00 00 00 00 00 00 00 00 00 00 00 00 00 00
0xC0: 00 00 00 00 00 00 00 00 00 00 00 00 00 00 00 00
0xD0: 00 00 00 00 00 00 00 00 00 00 00 11 1D AA CF 71
0xE0: 0B F2 AA 97 82 3D 7F D1 B4 B9 83 01 00 00 00 00
0xF0: 00 00 00 00 00 C0 EA 06 39 15 B5 02 4D 01 92 00
X2 Serial EEPROM Contents:
Non-Volatile Register (NVR) Fields
X2 Version: 0x14=MSA Version 0x1E
NVR Size in bytes: 0x100
Number of bytes used: 0x100
Basic Field Address: 0xB
Customer Field Address: 0x77
Vendor Field Address: 0xA7
Extended Vendor Field Address: 0x100
Reserved: 0x0
Transceiver type: 0x2=X2
Optical connector type: 0x1=SC
Bit encoding: 0x1=NRZ
Normal BitRate in multiple of 1M b/s: 0x2848
Protocol Type: 0x1=10 GbE
Standards Compliance Codes:
10 GbE Code Byte 0: 0x1=10GBASE-SR
10 GbE Code Byte 1: 0x0
SONET/SDH Code Byte 0: 0x0
SONET/SDH Code Byte 1: 0x0
SONET/SDH Code Byte 2: 0x0
SONET/SDH Code Byte 3: 0x0
10GFC Code Byte 0: 0x0
10GFC Code Byte 1: 0x0
10GFC Code Byte 2: 0x0
10GFC Code Byte 3: 0x0
Transmission range in 10m: 0x1E
Fibre Type:
Fibre Type Byte 0: 0x1=MM, Generic
Fibre Type Byte 1: 0x0=Unspecified
Centre Optical Wavelength in 0.01 nm steps—Channel 0: 0x1 0x4C 0x8
Centre Optical Wavelength in 0.01 nm steps—Channel 1: 0x0 0x0 0x0
Centre Optical Wavelength in 0.01 nm steps—Channel 2: 0x0 0x0 0x0
Centre Optical Wavelength in 0.01 nm steps—Channel 3: 0x0 0x0 0x0
Package Identifier OUI: 0xC09820
Transceiver Vendor OUI: 0x3400901
Transceiver vendor name: CISCO-OPNEXT,INC
Part number provided by transceiver vendor: TRT2005EN-SMC-16
Revision level of part number provided by vendor: 06
Vendor serial number: ONT164002KL
Vendor manufacturing date code: 2012100200

Check#1—Values from registry hex locations 85-100 (bolded above): 4F 4E 54 31 36 34 30 30 32 4B 4C 20 20 20 20, are taken and converted from hex to ascii. The converted value: ONT164002KL, should match the unit serial number above.

Check#2—A manufacturer may follow an eleven character serial number nomenclature for its products, where the first 3 characters (ONT, FNS, AGS, AGM, MTD, OPC, OPA, etc.) define the Vendor name, the next 4 characters (yyww) define the date code, and the last 4 characters (xxxx) are Vendor specific. For example:
ONT-OPNEXT
YY-4; YEAR-16−4=12; 2012
WW; WORK WEEK—40; week in October
XXXX; Lot number—0200, vendor use.

This calculated date month and year from serial number should match the manufacturing date code, month and year 2012100200.

Also, values from registry location 101-110 (also bolded above and set off by a "I" character): 20 32 30 31 32 31 30 30 32 30 30, are taken and converted from hex to ascii. The converted value: 2012100200, should match the vendor manufacturing date code.

Figure 6:
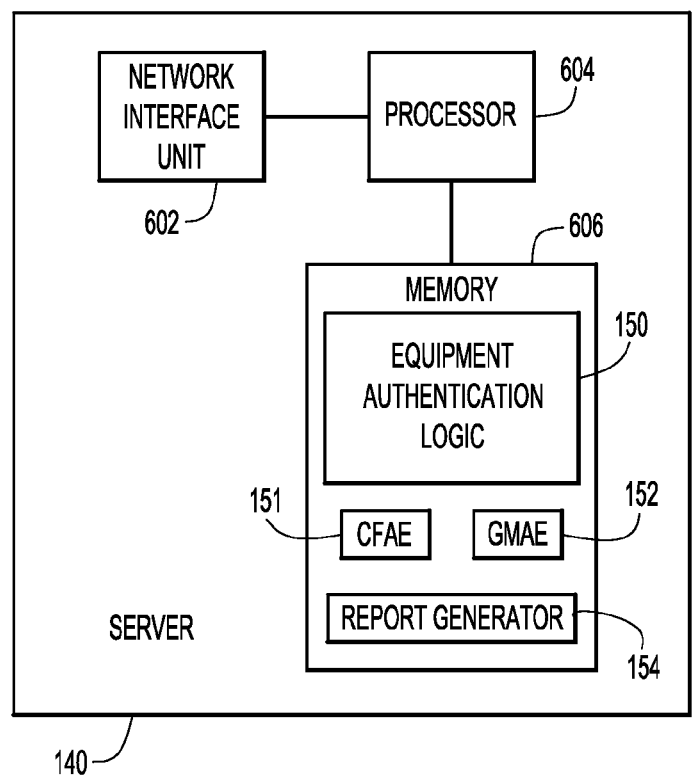
FIG. 6 depicts a hardware implementation for a server that hosts equipment authentication logic in accordance with one possible implementation.

Reference is now made to FIG. 6, which shows an example block diagram of server 140 of FIG. 1 that hosts Authentication Equipment Logic 150 and related components. Server 140 comprises a network interface unit 602, a processor 604 and a memory unit 606. Network interface unit 602 is configured to, e.g., receive (and acknowledge receipt of) information collected about network connected equipment from, e.g., Information Collector 170. Network interface unit 602 is coupled to processor 604. Processor 604 is, for example, a microprocessor, microcontroller or application specific integrated circuit (ASIC) that is configured to execute program logic instructions (e.g., software) for carrying out various operations and tasks of Equipment Authentication Logic 150, as described above. The functions of processor 604 may be implemented by logic encoded in one or more tangible computer readable storage media or devices (e.g., storage devices, compact discs, digital video discs, flash memory drives, etc. and embedded logic such as an application specific integrated circuit, digital signal processor instructions, software that is executed by a processor, etc.).

Memory 606 may comprise read only memory (ROM), random access memory (RAM), magnetic disk storage media devices, optical storage media devices, flash memory devices, electrical, optical, or other physical/tangible (non-transitory) memory storage devices. Memory 606 may store software instructions for performing the analyses using Equipment Authentication Logic 150, CFAE 151 and GMAE 152, and report generator 154 describe above. Thus, in general, memory 606 may comprise one or more computer readable storage media (e.g., a memory storage device) encoded with software comprising computer executable instructions that, when executed (e.g., by processor 604) are operable to perform the operations described for equipment authentication.

The above description is intended by way of example only.

What is claimed is:

1. A method, comprising:
    querying a piece of network-connected equipment for a plurality of attribute values characterizing the equipment, the plurality of attribute values including first component-specific information identifying components of the equipment, and first location-specific information identifying a present location of the equipment;
    receiving, in response to the querying, information about the piece of network-connected equipment, wherein the information includes the plurality of attribute values characterizing the equipment;
    comparing the attribute values to stored values, the stored values including second component-specific information identifying authentic components of the equipment, and second location-specific information identifying a location of where the equipment was known to be installed;
    when one or more of the attribute values corresponding to the first location-specific information are determined not to match the stored values corresponding to the second location-specific information, from the comparing, designating the equipment as non-authentic equipment;
    when one or more of the attribute values corresponding to the first component-specific information are determined not to match the stored values corresponding to the second component-specific information, from the comparing, designating the equipment as non-authentic equipment, wherein the comparing comprises verifying for the first component-specific information that the piece of network-connected equipment, when repaired, was repaired in an authorized repair facility; and
    querying the non-authentic equipment for a corresponding Internet Protocol (IP) address and host name, and utilizing the IP address and the host name to determine the location of the non-authentic equipment targeted for replacement.

2. The method of claim 1, wherein receiving information comprises receiving the information from a node within a targeted enterprise.

3. The method of claim 2, wherein receiving comprises receiving more attributes than are needed to accurately designate the equipment as non-authentic.

4. The method of claim 1, wherein comparing comprises comparing at least one of the attribute values to a stored valued obtained from a database of an original equipment manufacturer.

5. The method of claim 1, wherein comparing comprises comparing at least one of the attribute values to a stored value obtained from a database of returned equipment.

6. The method of claim 1, wherein designating the equipment as non-authentic equipment comprises designating the equipment as counterfeit.

7. The method of claim 1, wherein designating the equipment as non-authentic equipment comprises designating the equipment as grey marketed.

8. The method of claim 1, wherein designating the equipment as non-authentic equipment comprises designating the equipment as counterfeit upgraded.

9. The method of claim 1, wherein the equipment comprises at least one of a network router, network switch or line card.

10. The method of claim 1, wherein the information about the piece of network-connected equipment is received without an indication of the IP address via which the piece of network-connected equipment can be accessed.

11. An apparatus, comprising:
    a memory;
    a network interface; and
    a processor, wherein the processor is configured to:
        query a piece of network-connected equipment for a plurality of attribute values characterizing the equipment, the plurality of attribute values including first component-specific information identifying components of the equipment, and first location-specific information identifying a present location of the equipment;
        receive, via the network interface and in response to the query, information about the piece of network-connected equipment, wherein the information includes the plurality of attribute values characterizing the equipment;
        compare the attribute values to stored values stored in the memory, the stored values including second component-specific information identifying authentic components of the equipment, and second location-specific information identifying a location of where the equipment was known to be installed;
        designate the equipment as non-authentic equipment when one or more of the attribute values corresponding to the first location-specific information are determined not to match the stored values corresponding to the second location-specific information, from the comparing;
        designate the equipment as non-authentic equipment when one or more of the attribute values corresponding to the first component-specific information are determined not to match the stored values corresponding to the second component-specific information, from the comparing, wherein the processor is further configured to verify for the first component-specific information that the piece of network-connected equipment, when repaired, was repaired in an authorized repair facility; and
        query the non-authentic equipment for a corresponding Internet Protocol (IP) address and host name, and utilizing the IP address and the host name to determine the location of the non-authentic equipment targeted for replacement.

12. The apparatus of claim 11, wherein the processor is configured to receive the information from a node within a targeted enterprise.

13. The apparatus of claim 12, wherein the processor is configured to receive more attributes than are needed to accurately designate the equipment as non-authentic.

14. The apparatus of claim 11, wherein the processor is configured to compare at least one of the attribute values to a stored valued obtained from a database of an original equipment manufacturer.

15. The apparatus of claim 11, wherein the processor is configured to compare at least one of the attribute values to a stored value obtained from a database of returned equipment.

16. The apparatus of claim 11, wherein the processor is configured to designate the equipment as counterfeit.

17. The apparatus of claim 11, wherein the processor is configured to designate the equipment as grey marketed.

18. One or more non-transitory computer readable storage media encoded with software comprising computer executable instructions and when the software is executed operable to:

query a piece of network-connected equipment for a plurality of attribute values characterizing the equipment, the plurality of attribute values including first component-specific information identifying components of the equipment, and first location-specific information identifying a present location of the equipment;

receive, in response to the query, information about the piece of network-connected equipment, wherein the information includes the plurality of attribute values characterizing the equipment;

compare the attribute values to stored values, the stored values including second component-specific information identifying authentic components of the equipment, and second location-specific information identifying a location of where the equipment was known to be installed;

designate the equipment as non-authentic equipment when one or more of the attribute values corresponding to the first location-specific information are determined not to match the stored values corresponding to the second location-specific information, from the comparing;

designate the equipment as non-authentic equipment when one or more of the attribute values corresponding to the first component-specific information are determined not to match the stored values corresponding to the second component-specific information, from the comparing; and verify for the first component-specific information that the piece of network-connected equipment, when repaired, was repaired in an authorized repair facility; and query the non-authentic equipment for a corresponding Internet Protocol (IP) address and host name, and utilizing the IP address and the host name to determine the location of the non-authentic equipment targeted for replacement.

19. The non-transitory computer readable storage media of claim 18, wherein the instructions are operable to receive the information from a node within a targeted enterprise.

20. The non-transitory computer readable storage media of claim 19, wherein the instructions are operable to receive more attributes than are needed to accurately designate the equipment as non-authentic.

\* \* \* \* \*